(12) United States Patent
Mitani

(10) Patent No.: US 8,649,116 B2
(45) Date of Patent: Feb. 11, 2014

(54) LENS BARREL AND IMAGING OPTICAL SYSTEM

(75) Inventor: Yoshifumi Mitani, Osaka (JP)

(73) Assignee: Konica Minolta Advanced Layers, Inc., Tokyo (JP)

(*) Notice: Subject to any disclaimer, the term of this patent is extended or adjusted under 35 U.S.C. 154(b) by 67 days.

(21) Appl. No.: 13/482,061

(22) Filed: May 29, 2012

(65) Prior Publication Data

US 2012/0307385 A1   Dec. 6, 2012

(30) Foreign Application Priority Data

May 31, 2011   (JP) ................................. 2011-121750

(51) Int. Cl.
    *G02B 7/02* (2006.01)
(52) U.S. Cl.
    USPC .......................................................... 359/824
(58) Field of Classification Search
    USPC .......................................................... 359/824
    See application file for complete search history.

(56) References Cited

U.S. PATENT DOCUMENTS 4,297,002 A * 10/1981 Meatabi .................. 359/825
2010/0214670 A1 * 8/2010 Matsumoto et al. ......... 359/699

FOREIGN PATENT DOCUMENTS

JP   2007-017679 A   1/2007

* cited by examiner

*Primary Examiner* — James Jones
(74) *Attorney, Agent, or Firm* — Brinks Gilson & Lione

(57) ABSTRACT

A lens barrel of the present invention is provided with an electric section having a plurality of sliding portions that slide along the predetermined conductor pattern. The electric section is provided with a thin-sheet electric section body supporting the plurality of sliding portions, and a reinforcing portion is provided at the electric section body. Therefore, in the lens barrel 1, the reinforcing portion increases the deformation resistance of the electric section body that supports the sliding portions.

8 Claims, 8 Drawing Sheets

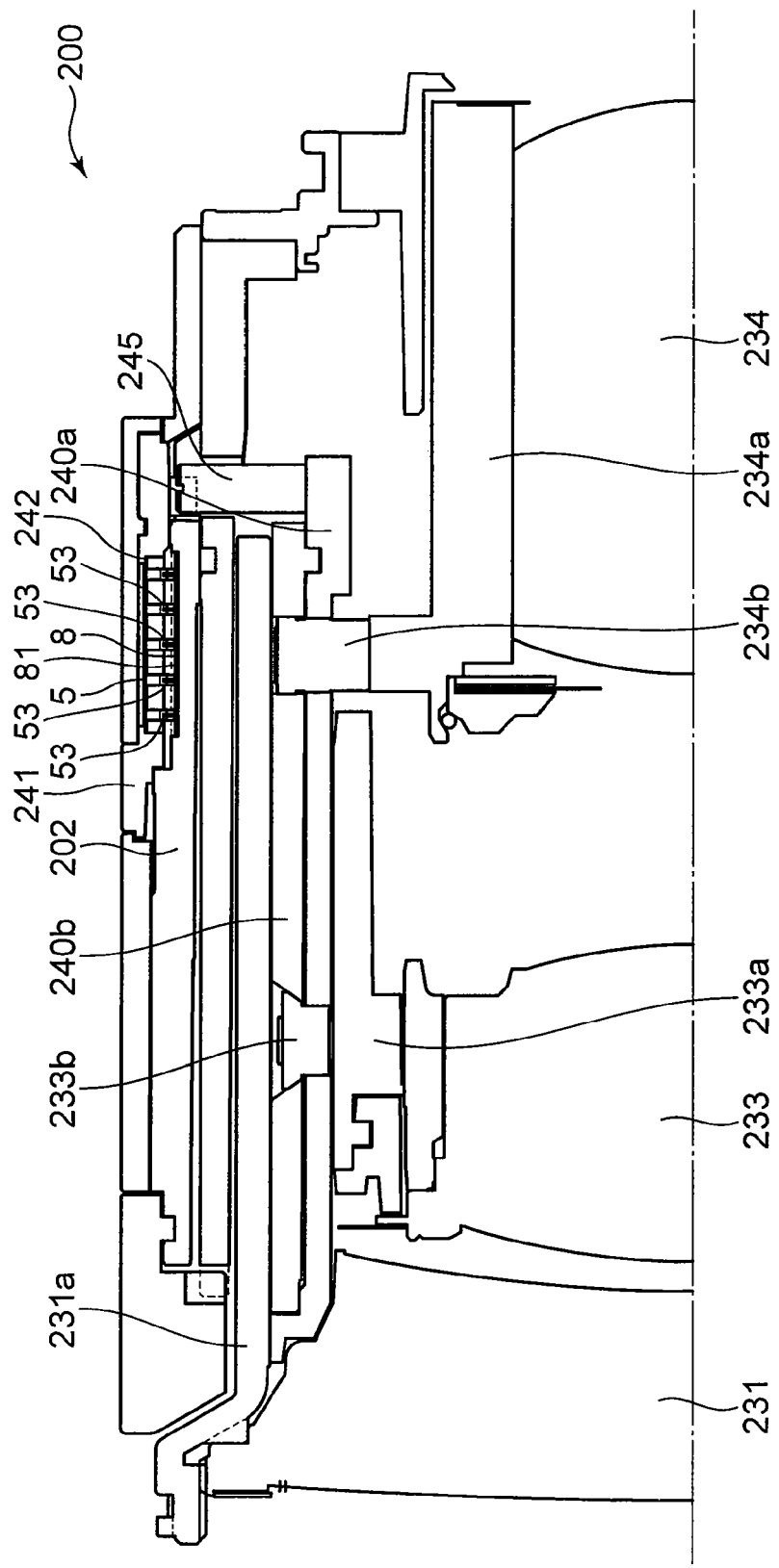

LENS BARREL AND IMAGING OPTICAL SYSTEM

BACKGROUND OF THE INVENTION

1. Field of the Invention

The present invention relates to a lens barrel of a camera or the like and an imaging optical system provided with such lens barrel.

2. Background Art

Lens barrels, for example, of cameras are often provided with a position detection device for performing position control of a movable lens group. For example, when a movable lens group is moved with respect to a fixed tube by drive operating an annular lens engagement member that is engaged with the movable lens group, the lens drive position is detected by detecting the relative positions of the lens engagement member and the fixed tube. The technique for performing such position detection is disclosed, for example, in Japanese Patent Application Publication No. 2007-17679. An encoder device disclosed in Japanese Patent Application Publication No. 2007-17679 is provided with an electric section body in the form of a thin sheet and a plurality of sliding pieces having a sliding portion at the distal end and supported in the arranged state at the electric section body which constitutes an electric section (zoom brush). In the encoder device, the electric section body is screwed to an annular lens engagement member (zoom operation ring) and the movable lens group moves in the optical axis direction following the rotation of the lens engagement member. The sliding portion slides along the conductor pattern of the flexible printed board that is held at the fixed tube (fixed portion) and has the conductor pattern. Further, in the encoder device, the relative positions of the lens engagement member and the fixed tube are detected by detecting the combination of conductive states of the conductor pattern and the sliding portion.

However, in the encoder device described in Japanese Patent Application Publication No. 2007-17679, for example, when the thin-sheet electric section body is screwed to the lens engagement member, the electric section body is sometimes deflected in the arrangement direction of the sliding portions. Where such deformation occurs, the sliding portion can come into contact with the adjacent line of the conductor pattern when sliding along the conductor pattern.

Further, since the electric section is screwed to the lens engagement member, the lens engagement member is required to be thick enough so that the threaded hole for the screw could be formed therein and the space for arranging the screw is required. For this reason, the dimension of the lens engagement member in the diametrical direction increases and the lens engagement member is difficult to miniaturize. Furthermore, when the electric section is screwed to the lens engagement member, the position of the electric section with respect to the conductor pattern is difficult to adjust. For example, where the lens engagement member is displaced with respect to the fixed tube or an error has occurred in the production of the printed board, the electric section is difficult to set at the predetermined position with respect to the printed board.

SUMMARY OF THE INVENTION

The present invention has been created with consideration for the above-described problems and it is an object thereof to provide a lens barrel equipped with an electric section in which an electric section body that supports sliding portions is made resistant to deformation and also to provide an imaging optical system using the lens barrel.

The lens barrel and imaging optical system in accordance with the present invention are provided with an electric section having a plurality of sliding portions that slide along a predetermined conductor pattern, the electric section is provided with a thin-sheet electric section body that supports the plurality of sliding portions, and a reinforcing section is provided at the electric section body. Therefore, in such lens barrel and imaging optical system, the reinforcing portion increases the deformation resistance of the electric section body that supports the sliding portions.

These and other objects, features and advantages of the present invention will become more apparent upon reading the following detailed description along with the accompanying drawings.

BRIEF DESCRIPTION OF THE DRAWINGS

FIG. 9 is a half-sectional view of the imaging optical system provided with the lens barrel of the other embodiment.

DETAILED DESCRIPTION OF THE PREFERRED EMBODIMENTS

Figure 1:
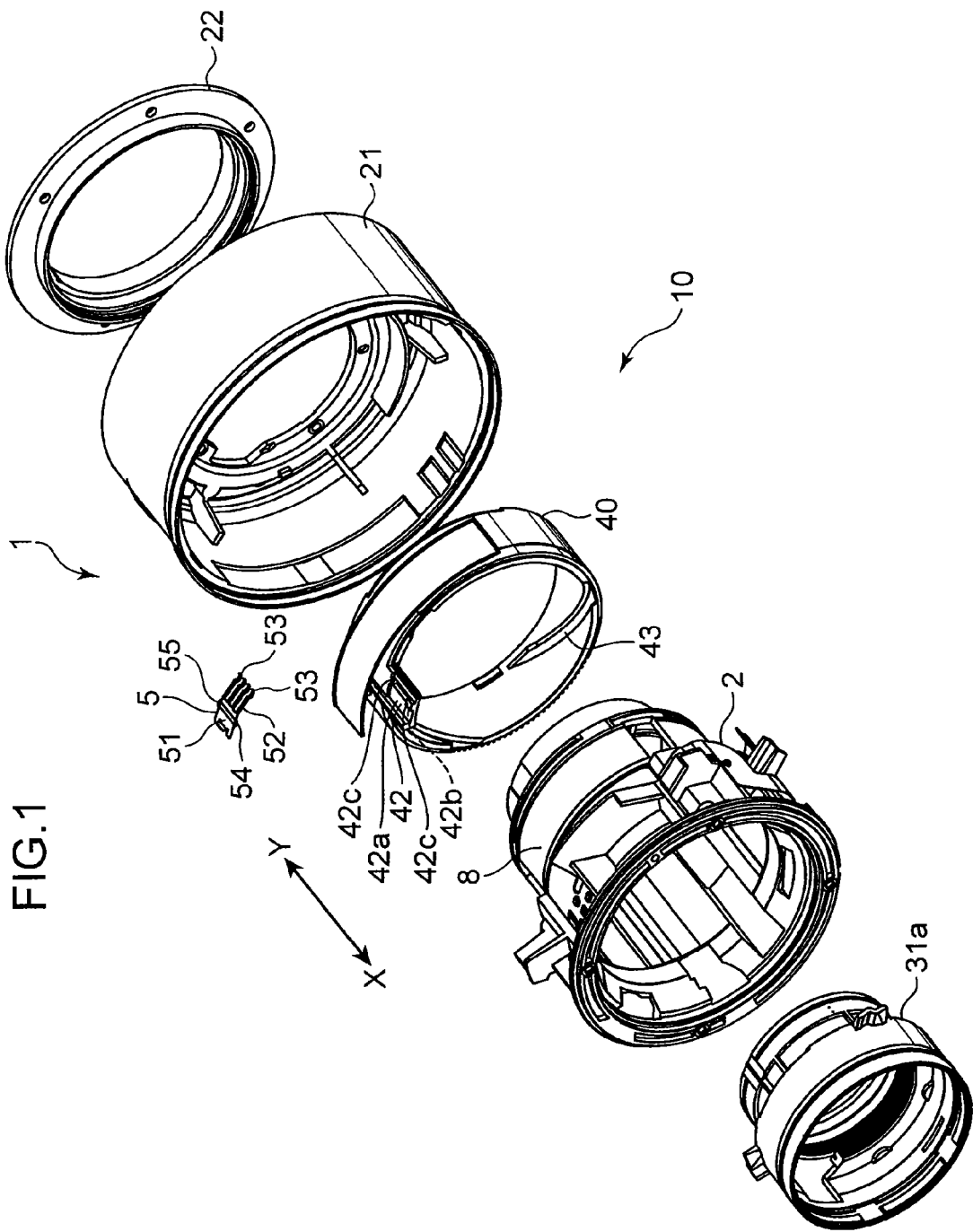
FIG. 1 is an exploded perspective drawing of the principal portion of the lens barrel in an embodiment.

Embodiments of the present invention will be described hereinbelow with reference to the accompanying drawings. The components assigned with like reference numerals in the drawings are like components and the redundant explanation thereof is omitted.

Figure 2:
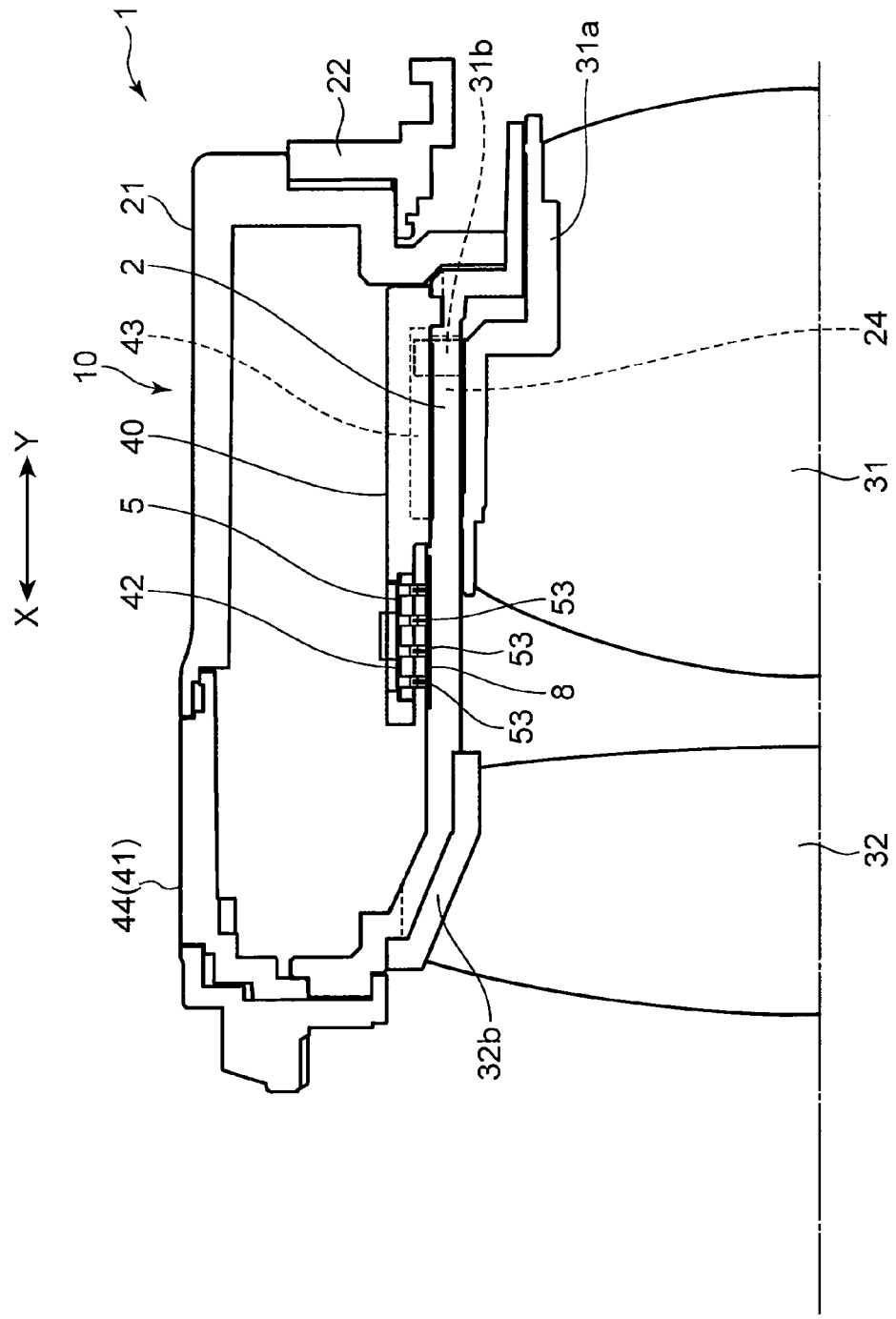
FIG. 2 is a half-sectional view of the imaging optical system provided with the lens barrel of the embodiment.
Figure 3:
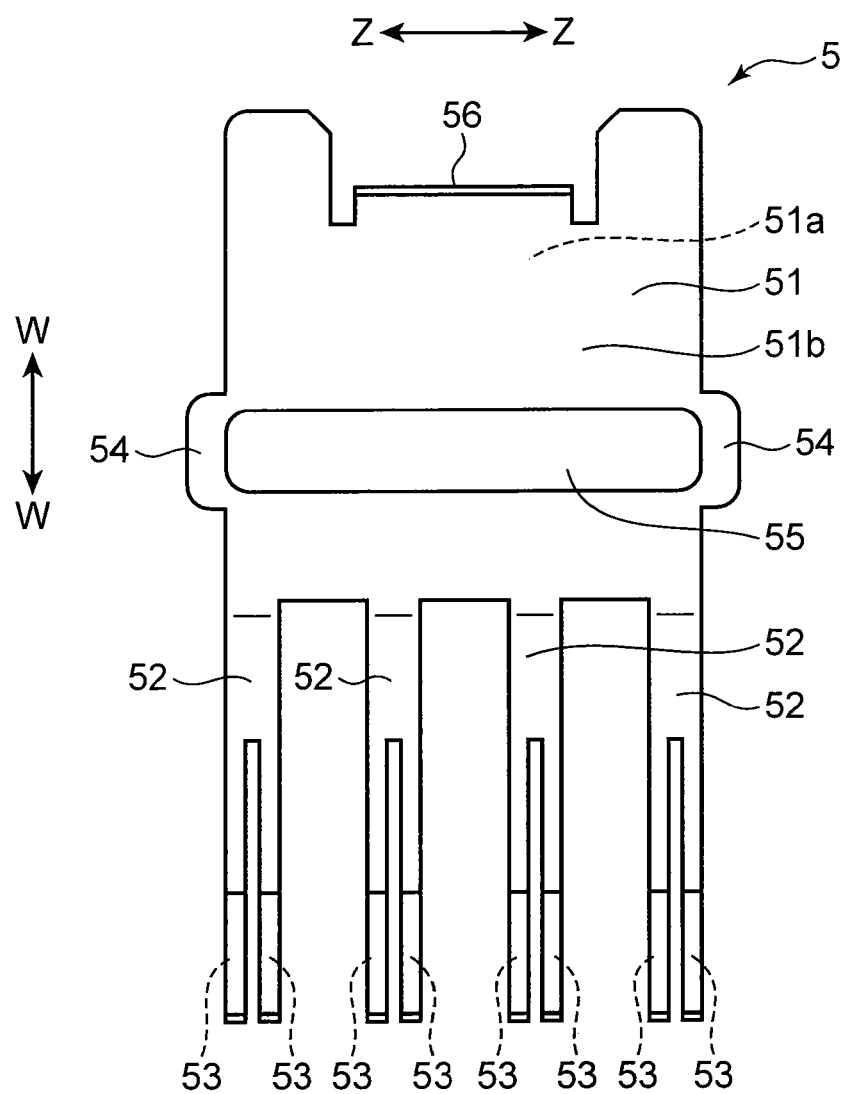
FIG. 3 is an enlarged plane view of the electric section used in the lens barrel and imaging optical system shown in FIGS. 1 and 2.
Figure 4:
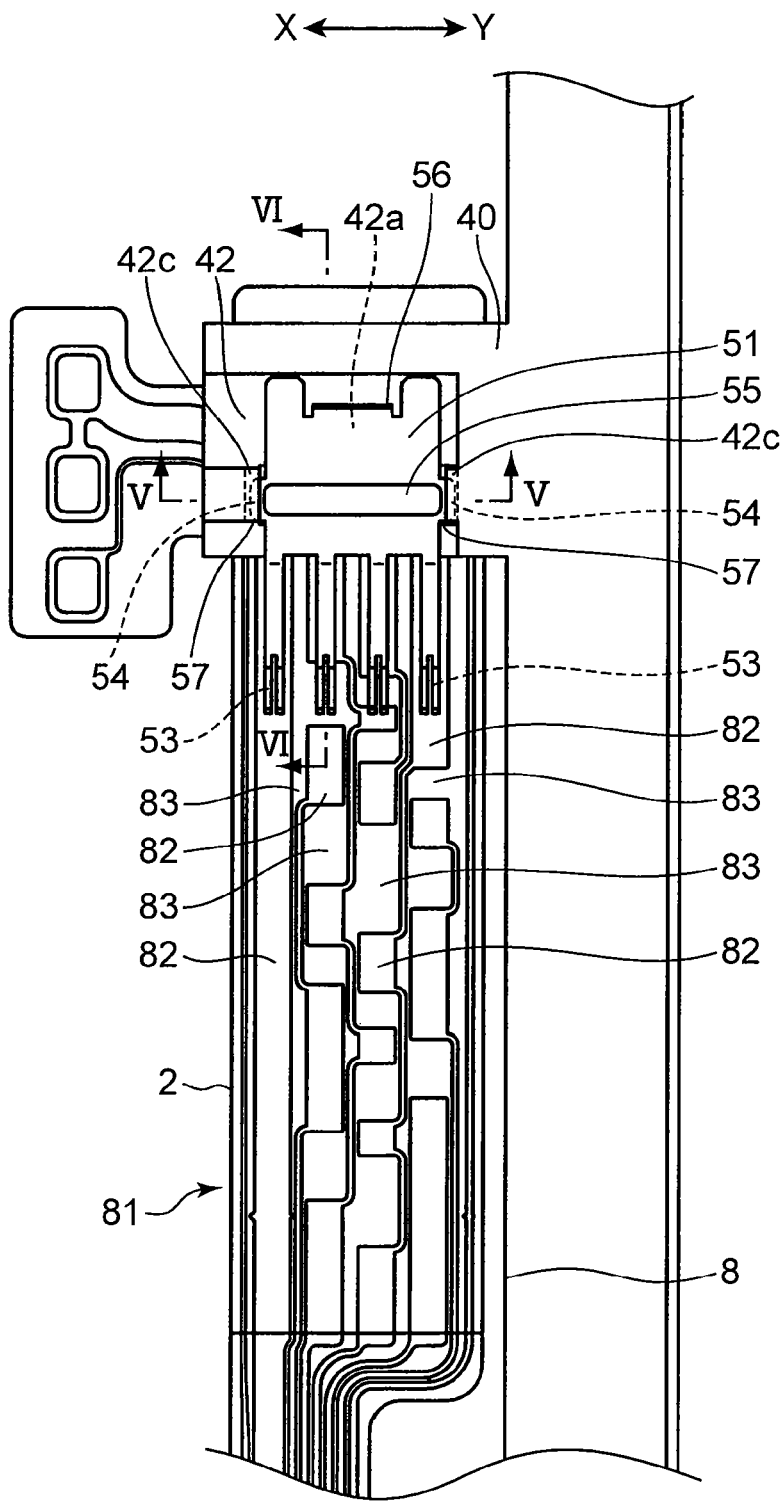
FIG. 4 is an enlarged plan view of the principal portion of the lens barrel.
Figure 5:
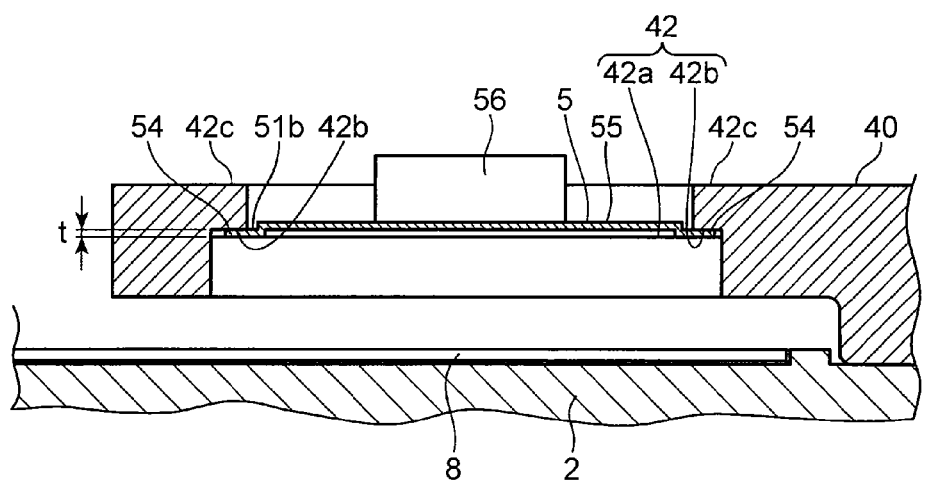
FIG. 5 is a cross-sectional view along the V-V section in FIG. 4.
Figure 6:
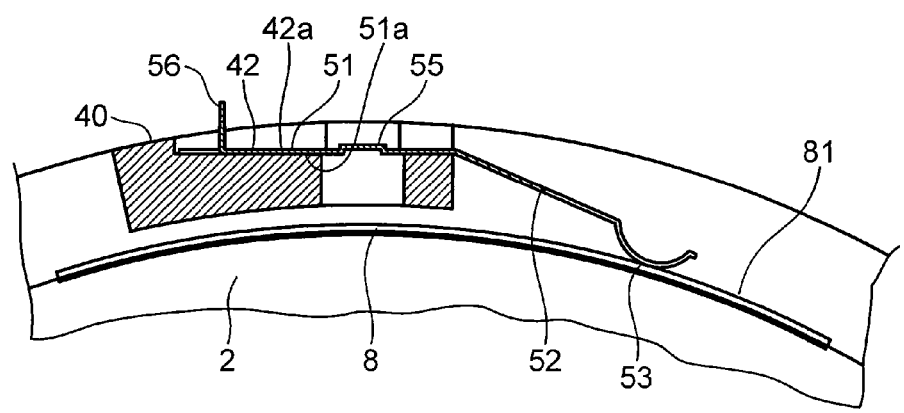
FIG. 6 is a cross-sectional view along the VI-VI section in FIG. 4.

FIG. 1 is an exploded perspective drawing of the principal portion of the lens barrel in one embodiment. FIG. 2 is a half-sectional view of the imaging optical system provided with the lens barrel in FIG. 1. FIG. 3 is an enlarged plane view of the electric section. The explanation below is conducted by taking the X direction shown in FIGS. 1 and 2 as the direction forward (object side) and Y direction as the direction rearward (image side). FIG. 4 is an enlarged plan view of the principal portion of the lens barrel shown in FIGS. 1 and 2. FIG. 5 is a cross-sectional view along the V-V section in FIG. 4. FIG. 6 is a cross-sectional view along the VI-VI section in FIG. 4.

As shown in FIG. 2, an imaging optical system of the embodiment is provided with a lens barrel 1 and lens groups 31, 32 accommodated in the lens barrel 1 as shown in FIG. 2.

As shown in FIGS. 1 and 2, the lens barrel 1 is provided with a barrel body 10 and an electric section 5 attached to the barrel body 10. The barrel body 10 is provided with a cylindrical fixed tube 2 and drive members 40, 41 that drive the lens group 31. The drive members 40, 41 are rotatably held at the fixed tube 2. The drive members 40, 41 may be configured to enable translatory motion.

A printed board 8 is held at the outer circumference of the fixed tube 2 by attaching with fixing means such as an adhesive.

The printed board 8 is a constitution member of a position detection device and constitutes the position detection device that detects the position of the lens group 31 relative to the fixed tube 2 with the electric section 5 and the like. In the present embodiment, the printed board 8 is, for example, a flexible printed board. The printed board 8 may be also a rigid board. In such case, the drive members 40, 41 preferably perform translatory motion. As shown in FIG. 4, the printed board 8 is provided with a conductor pattern 81.

The conductor pattern 81 of the present embodiment is provided with a plurality of conductive portions 82 formed so as to extend in a longitudinal direction with a predetermined spacing in a width direction and non-conductive portions 83 formed between the conductive portions 82 adjacent in the width direction. In FIG. 4, the width direction is the XY direction which is along the axial direction of the fixed tube 2, and the longitudinal direction is perpendicular to the width direction.

The conductor pattern 81 of the printed board 8 configured in the above-described manner is attached with an adhesive to the outer circumferential surface of the fixed tube 2 so that the longitudinal direction extends in the circumferential direction of the fixed tube 2, and the conductive portions 82 are connected by an electric wire (not shown in the figure) to a control unit (not shown in the figure) provided at the fixed tube 2.

Returning to FIGS. 1 and 2, in the fixed tube 2, a mount member 22 is fixedly attached to the rear end side (Y direction in FIG. 2) of the fixed tube 2, with an outer tube 21 being interposed therebetween. The barrel body 10 is mounted on a camera body (not shown in the figures) by connecting the mount member 22 to the camera body.

In the present embodiment, as shown in FIG. 2, an optical system that forms an optical image of an object (imaging object) is provided with the movable lens group 31 that moves relative to the fixed tube 2 and the fixed lens group 32 that does not move relative to the fixed tube 2. Thus, the optical system of the present embodiment is of a front lens fixed type.

The movable lens group 31 is constituted by one or a plurality of lenses, or by plurality of lens groups. The movable lens group 31 is held by a movable lens group holding frame 31a. The movable lens group holding frame 31a is provided with a rod-like (in the present embodiment, round rod-like) engagement protrusion 31b.

The engagement protrusion 31b is slidably inserted into a guide groove 24 (elongated groove) provided along the axial direction of the fixed tube 2, and the movable lens group holding frame 31a is held at the inner circumference of the fixed tube 2 so that the movable lens group holding frame can move in the axial direction of the fixed tube 2. In this state the optical axis and the center axis of the fixed tube 2 coincide.

In the present embodiment, the fixed lens group 32 is provided in front of the movable lens group 31 and immovably held by a fixed lens group holding frame 32b at the inner circumference of the fixed tube 2.

In the present embodiment, as shown in FIGS. 1 and 2, the drive member is provided with the lens engagement member 40 and the drive operation member 41 (shown in FIG. 2) that operates the lens engagement member 40. As shown in FIG. 1, the lens engagement member 40 has a cylindrical (annular) shape.

A section holding portion 42 that holds the electric section 5 is provided at the outer circumference of the lens engagement member 40. The section holding portion 42 is provided with a body receptacle 42a and a locking portion receptacle 42b (shown in FIG. 5).

As shown in FIGS. 5 and 6, the body receptacle 42a is formed to face diametrically outward and receives one face 51a of the electric section body 51 of the below-described electric section 5. The locking portion receptacle 42b is formed to face diametrically inward at the side opposite that of the body receptacle 42a at a position adjacent to the body receptacle 42a in the circumferential direction and receives another face 51b, on the side opposite that of the one face 51a, of the electric section body 51 in a locking piece 54 serving as a locking portion of the below-described electric section 5.

In the present embodiment, as shown in FIGS. 4 and 5, the locking portion receptacle 42b is constituted by respective inner surfaces of a pair of holding pieces 42c. These holding pieces 42c are provided to protrude, so that openings 57 are formed at both sides in the circumferential direction, toward each other and separated from each other by a predetermined distance in the axial direction, and the locking portion receptacle 42b located on the inner surface thereof is provided at a predetermined distance t diametrically outward from the body receptacle 42a.

Further, a cam groove 43 that slidably engages with the engagement protrusion 31b, as shown in FIG. 1, is provided at the inner circumference of the lens engagement member 40. The cam groove 43 is formed to extend obliquely forward at a predetermined angle to the axial direction and circumferential direction.

As shown in FIG. 2, the lens engagement member 40 is held at the fixed tube 2 rotatably around the center axis of the fixed tube 2 (about the optical axis) at the inner circumferential side of the outer tube 21 and the outer circumferential side of the fixed tube 2.

In this state, the distal end of the engagement protrusion 31b that is fitted into the guide groove 24 of the fixed tube 2 and protrudes from the inner groove 24 is fitted into and engaged with the cam groove 41 of the lens engagement member 40, and the engagement protrusion 31b, which is engaged with the cam groove 41, moves along the guide groove 24 of the fixed tube 2 following the rotation of the lens engagement member 40. As a result, the movable lens 31 moves forward and backward along the optical axis direction with respect to the fixed tube 2.

The drive member 41 is provided with a manually operated ring 44 (shown in FIG. 2), which is connected to the lens engagement member 40, and an autofocus motor (not shown in the figures), and the lens engagement member 40 is driven and rotated by the operation of either of the ring and the motor.

More specifically, the manually operated ring 44 is rotatably held at the fixed tube 2 so that the ring can be manually rotated at the outer circumferential side of the fixed tube 2 on the front side of the outer tube 21. Further, the manually operated ring 44 is connected to a gear group (not shown in the figure) provided at the fixed tube 2. This gear group is connected to the lens engagement member 40, and the rotation of the manually operated ring 44 is transmitted by the gear group to the lens engagement member 40. The manually operated ring 44 is not shown in FIG. 1.

The autofocus motor is provided at the outer circumference of the fixed tube 2 and connected to the gear group separately from the manually operated ring 44. Where the autofocus motor is started, the rotation thereof is transmitted by the gear group to the lens engagement member 40.

The electric section 5 is described below. In the present embodiment, as shown in FIG. 3, the electric section 5 is provided with the electric section body 51 and a plurality (in the present embodiment, four) of sliding pieces 52 supported on the electric section body 51.

Each sliding piece 52 is provided with the sliding portion 53 at the distal end thereof. In the present embodiment, the distal end side of each sliding piece 52 is divided in two. Therefore, each sliding piece 52 is provided with two sliding portions 53.

These sliding pieces 52 are arranged with a predetermined spacing along the width direction (Z-Z direction) of the electric section body 51. The sliding pieces 52 extend in the direction (W-W direction) perpendicular to the width direction, and the proximal end of each sliding piece 52 is fixedly supported at one end of the electric section body 51 in the abovementioned perpendicular direction.

In the present embodiment, the sliding pieces 52 are formed integrally with the electric section body 51 and provided in an extending condition from one end of the electric section body 51 in the abovementioned perpendicular direction.

The electric section body 51 is constituted by a thin-sheet conductor of a substantially rectangular shape. In the present embodiment, the material thereof is stainless steel (SUS) and the thickness is about 0.1 mm. Locking pieces 54 are provided at both ends of the electric section body 51 in the width direction (Z-Z direction), which is the arrangement direction of the sliding portions 53. These locking pieces 54 serve as locking portions that hold the electric section 5 at the section holding portion 42 provided at the lens engagement member 40 of the barrel body 10. In the present embodiment, an operation piece 56 which is grasped and operated, for example, when the electric section body 51 is held, is provided at the end of the electric section body 51.

The locking pieces 54 protrude by a predetermined amount in the width direction from the electric section body 51 at both ends in the width direction.

Further, a rib-like protruding portion 55 is provided between the two locking pieces 54 in the electric section body 51, that is, at the same position as the locking pieces 54 in the direction perpendicular to the width direction, which is the arrangement direction of the sliding portions 53 in the electric section body 51. The rib-like protruding portion 55 is a reinforcing portion that reinforces the electric section body 51 to make it resistant to flexural deformation in the abovementioned arrangement direction. In the present embodiment, the rib-like protruding portion 55 is formed along the width direction (Z-Z direction), thereby further increasing the resistance to flexural deformation in the arrangement direction.

Further, the rib-like protruding portion 55 is formed along the width direction, but it may be also formed in the direction crossing the width direction, and the formation direction thereof can be changed as appropriate.

The rib-like protruding portion 55 of the present embodiment is formed over substantially the entire width between the two locking pieces 54 in the electric section body 51 by pressing out and causing to protrude part of the electric section body 51 from one face 51a toward the other face 51b.

The electric section 5 of the above-described configuration is held in the below-described manner at the section holding portion 42 of the lens engagement portion 40 in a state in which the electric section can communicate with the control unit provided at the barrel body 10 via an electric wire (not shown in the figure) connected to the end portion of the electric section body 51.

The locking pieces 54 of the electric section 5 are provided to be inserted from the openings 57, which are formed at the circumferential side of the abovementioned holding pieces 42c, diametrically inside the locking portion receptacle 42b in the section holding portion 42 of the lens engagement member 40.

In this state, the electric section body 51 on the one face 51a side faces the body receptacle 42a of the section holding portion 42, and the electric section body 51 and the section holding portion 42 assume a state in which the locking piece 54 on the other face 51b side faces the locking portion receptacle 42b.

Further, when the locking pieces 54 are arranged diametrically inward of the locking portion receptacle 42b, the sliding portions 53 of the electric section 5 are pressed against the conductor pattern 81 and an elastic force is accumulated in the sliding pieces 52.

Under the effect of this elastic force, the electric section body 51 on the one face 51a side is pushed against the body receptacle 42a of the section holding portion 42, and the locking piece 54 on the other face 51b side is pushed against the locking portion receptacle 42b. As a result, a state is assumed in which the electric section 5 is held at the section holding portion 42 of the lens engagement member 40.

In the aforementioned state, the electric section body 51 is controlled so that the locking pieces 54 practically cannot move in the width direction in the respective holding pieces 42c, but when a force equal to or greater than the abovementioned elastic force is applied in the direction perpendicular to the width direction, the movement is possible.

In this case, the electric section 5 is held by two locking pieces 54 provided at both end sides of the electric section body 51 in the width direction, and the rib-like protruding portion 55 is provided between the two locking pieces 54. Therefore, the electric section body 51 can be prevented from warping, that is, from being deformed in the thickness direction (flexural deformation). As a result, the position of the electric section body in the arrangement direction of the sliding portions 53 is stable.

Since the electric section 5 is held by an elastic force, it is not necessary for the lens barrel 1 to have a thickness required for forming a screw hole for screwing in the drive member as in the case of the conventional configuration, no space is required for arranging the screw, and the size in the diametrical direction can be reduced. Therefore, the lens barrel 1 can be reduced in size.

Further, in such a state, for example, when the operation piece 56 is grasped and the electric section 5 is pushed or pulled in the direction perpendicular to the width direction, the electric section 5 moves in the circumferential direction of the lens engagement member 40 against the abovementioned elastic force. Therefore, in the lens barrel 1 of the abovementioned configuration, the sliding portions 53 of the electric section 5 can be arranged, while being aligned with the predetermined positions of the conductor pattern 81, and for example even when the lens engagement member 40 is displaced with respect to the fixed tube 2 or an error has occurred in the production of the conductor pattern 81 of the printed board 8, the electric section 5 can still be positioned and held at the predetermined position with respect to the printed board 8.

After the positions of the sliding portions 53 of the electric section 5 have been adjusted, the electric section 5 can be held by the elastic force at the section holding portion 42 of the lens engagement member 40 and can be used as is in this state. However, it is also possible, for example, to hold the electric section 5 by the elastic force in the above-described manner and then further fix the locking piece 54 and the locking portion receptacle 42b by bonding with an adhesive.

The operation of the lens barrel 1 of the above-described configuration will be described below. Where the manually operated ring 44 is manually rotated, or when the autofocus switch is pushed and the autofocus motor is started, the lens engagement member 40 is rotated through the gear group.

When the lens engagement member 40 is rotated, the engagement protrusion 31b is guided by the cam groove 43b and the guide groove 24, and the movable lens group 31 moves in the optical axis direction with respect to the fixed tube 2.

Further, when the lens engagement member 40 rotates, the sliding portions 53 of the electric section 5 slide along the conductor pattern 81 of the printed board 8. A signal representing the conduction state of the sliding portions 53 and the conductor pattern 81 is sent to the control unit, and the control unit that has received the signal detects the position of the lens engagement member 40 with respect to the fixed tube 2 on the basis of the received signal and information which has been stored in advance and in which the positions of the sliding portions 53 relative to the conductor pattern 81 and the position of the lens engagement member 40 relative to the fixed tube 2 are associated. Based on the detection result, the control unit performs focus control.

In the abovementioned embodiment, the reinforcing portion is constituted by the rib-like protruding portion 55 that is provided in a protruding manner by pushing out part of the electric section body 51 by press molding, but such a configuration is not limiting and can be changed as appropriate. For example, the reinforcing portion may be configured separately from the electric section body 51.

Figure 7:
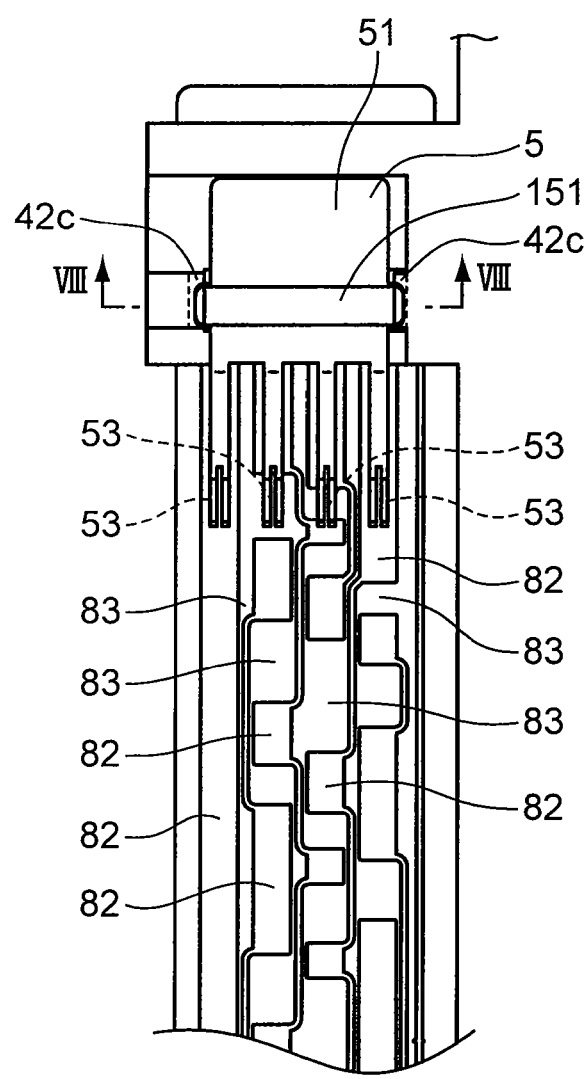
FIG. 7 is an enlarged explanatory drawing of the principal portion of the lens barrel using the electric section of another embodiment.
Figure 8:
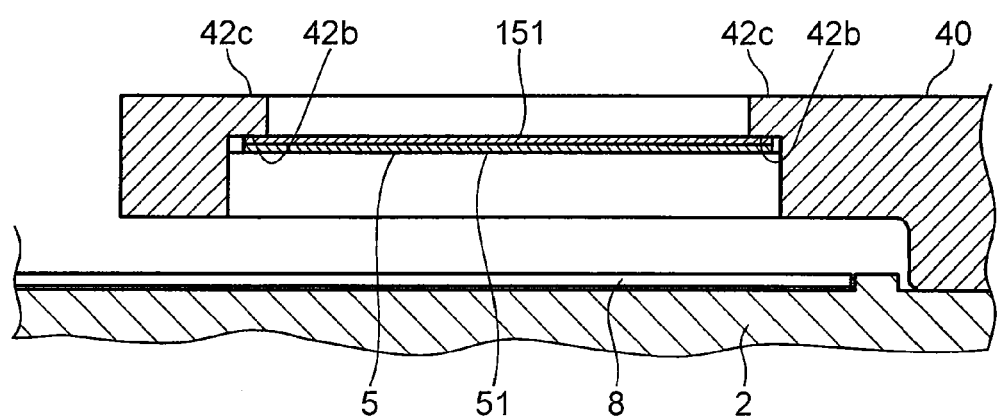
FIG. 8 is a cross-sectional view along the VIII-VIII section in FIG. 7.

FIG. 7 is an enlarged explanatory drawing of the principal portion of the lens barrel using the electric section of another embodiment. FIG. 8 is a cross-sectional view along the VIII-VIII section in FIG. 7.

More specifically, as shown in FIGS. 7 and 8, a reinforcing portion is constituted by a thin-sheet reinforcing plate body 151, and the reinforcing plate body 151 is placed on top of the electric section body 51 and provided so as to be in contact with the locking portion receptacle 42b. This configuration also can make the electric section body 51 resistant to flexural deformation in the width direction.

When the reinforcing portion is constituted by the reinforcing plate body 151 as described hereinabove, both end portions of the reinforcing plate body 151 function as locking portions 152. Therefore, it is possible to provide or not to provide the locking portions at the electric section body 51. Further, the length of the reinforcing plate body 151 in the abovementioned perpendicular direction may be equal to that of the protruding piece, or may be longer or shorter than that.

Further, in the above-described embodiment, the reinforcing portion is provided at the same position as the locking portions at the electric section body 51 in the direction perpendicular to the abovementioned arrangement direction, but the position of the reinforcing portion relative to the electric section body 51 is not particularly limited. It is preferred that the reinforcing portion be provided at the electric section body 51 at the same position as the locking portions or between the locking portions and the sliding portions in the direction perpendicular to the arrangement direction, as in the above-described embodiment, because such a configuration can effectively inhibit the displacement of the sliding portions in the arrangement direction caused by the deformation of the electric section body.

Further, in the above-described embodiment, the electric piece 5 is held at the lens engagement member 40 of the drive member 4, but such a configuration is not limiting and for example the electric section 5 may be held at the drive operation member 241 of the drive member 204, as shown in FIG. 9, and changed as appropriate. FIG. 9 is a semi-sectional view of the imaging optical system provided with the lens barrel of the other embodiment.

More specifically, a lens barrel 200 shown in FIG. 9 is provided with three movable lens groups, namely, a first movable lens group 231 held at a first movable lens group holding frame 231a, a second movable lens group 233 held at a second movable lens group holding frame 233a, and a third movable lens group 234 held at a third movable lens group holding frame 234a, and drive members 240, 241 that drive those lens groups.

The drive member is provided with lens engagement members 240a, 240b and a drive operation member 241 that drives the lens engagement members 240a, 240b. The lens engagement members 240a, 240b include the first lens engagement member 240a that is provided diametrically inside the fixed tube 202 and rotatably with respect to the fixed tube 202, and the second lens engagement member 240b that is provided diametrically inside the fixed tube 202, diametrically outside the first lens drive member 240a and immovably with respect to the fixed tube 202.

Further, the first lens engagement member 240a is engaged with the first movable lens group 231 through a first engagement protrusion (not shown in the figure) and also engaged with the second movable lens group 233 through a second engagement protrusion 233b and engaged with the third movable lens group 234 through a third engagement protrusion 234b.

The second lens drive member 240b is engaged with the first lens drive member 240a and the second movable lens group 233 through the second engagement protrusion 233b and also engaged with the first lens drive member 240a and the third movable lens group 234 through the third engagement protrusion 234b.

The drive operation member 241 is provided diametrically outside the fixed tube 202 and rotatably with respect to the fixed tube 202. The drive operation member 241 is provided with a section holding portion 242 that holds the electric section 5, and the electric section 5 is held at the section holding portion 242. The section holding portion 242 has a configuration similar to that of the above-described section holding portion 42 of the lens engagement member 40 and includes a body receptacle and a locking portion receptacle.

Where the drive operation member 241 of the above-described configuration is rotationally operated, the first lens drive member 240a connected by a connection pin 245 is rotated. During this rotation, the first movable lens group 231 is moved in the optical axis direction by the first engagement protrusion (not shown in the figure), and the second movable lens group 233 and the third movable lens group 234 are moved in the optical axis direction by the second lens drive member 240a, the second engagement protrusion 233b, and the third engagement protrusion 234b.

During such rotation of the drive operation member 241, the electric section 5 slides along the conductor pattern 81 of the printer board 8 provided at the fixed tube 2, and the position of the first lens drive member 240a with respect to the fixed tube 202, that is, the positions of the first to third movable lens groups 231, 233, and 234, can be detected through the drive operation member 241 in the control unit. Explained hereinabove is an example in which the electric section 5 is held at the drive operation member 241 of the drive member 204.

Further, the configuration in which the electric section 5 is held at the drive member 4 is not limiting. For example, the configuration can be changed as appropriate so that the electric section 5 is held at the fixed tube 2 and the printed board is held at the drive member 4.

The specification discloses the aforementioned arrangements. The following is a summary of the primary arrangements of the embodiments.

The lens barrel according to one aspect includes a fixed tube; a drive member that moves a movable lens group in an optical axis direction relative to the fixed tube; a printed board that has a conductor pattern and is held at one of the fixed tube and the drive member; and an electric section that is held at the other one of the fixed tube and the drive member and has a plurality of sliding portions that slide along the conductor pattern, wherein the electric section is provided with a thin-sheet electric section body that supports the plurality of sliding portions arranged in a predetermined direction with a spacing therebetween; and the electric section body is provided with a reinforcing portion that that reinforces the electric section body to impart resistance to deformation thereto.

The imaging optical system according to another aspect is provided with the above-described lens barrel and one or a plurality of lenses accommodated in the lens barrel.

In the lens barrel and imaging optical system of the above-described configuration, the reinforcing portion can increase the deformation resistance of the electric section body, for example, in the arrangement direction of the sliding portions and can stabilize the position in the arrangement direction of the sliding portions. As a result, in the above-described lens barrel and optical imaging system, the probability of erroneous contact with the adjacent line can be reduced even when the number of lines in the conductor pattern is increased. Further, in the above-described lens barrel and optical imaging system, the spacing between the adjacent sliding portions can be reduced and the arrangement length of the sliding portions in the electric section can be reduced, thereby making it possible to reduce the entire lens barrel in size.

In another aspect, in the above-described lens barrel and optical imaging system, a section holding portion that holds the electric section is provided at the other one of the fixed tube and the drive member; locking portions that lock the electric section body to the section holding portion are provided at both ends of the electric section body in the arrangement direction of the sliding portions; and the locking portions are configured to be arranged in the section holding portion so that the electric section body cannot move in the arrangement direction, but can move in a direction perpendicular to the arrangement direction relative to the section holding portion, and be locked to the section holding portion in a state in which the electric section body is positioned with respect to the section holding portion in the perpendicular direction.

In the lens barrel and optical imaging system of such a configuration, the locking portions provided at both ends of the electric section body in the arrangement direction are held at the section holding portion provided at the other of the fixed tube and the drive member. Therefore, the electric section body can be made more resistant to deformation in the arrangement direction of the sliding portions and the position thereof in the arrangement direction of the sliding portions can be further stabilized.

Further, because the locking portions are configured as described hereinabove, in the lens barrel of the above-described configuration, the electric section can be positioned and held at the predetermined position, for example, even when the drive member is displaced with respect to the fixed tube or an error has occurred in the production of the printed board.

Further, the lens barrel of the above-described configuration and the imaging optical system of the above-described configuration do not use a fixing screw of the conventional configuration, the diametrical size can be reduced, and the lens barrel can be reduced in size.

In another aspect, the above-described lens barrel and optical imaging system are configured such that the sliding portions are provided at distal ends of respective elastic sliding pieces; the electric section body supports proximal ends of the sliding pieces; the section holding portion is provided with a body receptacle that receives one face side of the electric section body and a locking portion receptacle that is formed adjacently to the body receptacle in the direction opposite the direction of the body receptacle and receives the locking portions; and the locking portions protrude in the arrangement direction from both ends of the electric section body in the arrangement direction, and when the locking portions are received by the locking portion receptacle, the sliding portions and the conductor pattern come into contact with each other, whereby another face side that is on the side opposite to one face in the locking portion is pushed against the locking portion receptacle by an elastic force accommodated in the sliding pieces as a result of the contact.

With the lens barrel and optical imaging system of such configuration, the other face side in the locking portions is received in a state of being pushed against the locking portion receptacle by an elastic force accommodated in the sliding pieces as a result of the contact between the sliding portions and the conductor pattern. Therefore, the locking portions can be easily held in a fixed state in the locking portion receptacle and the assembling operation is facilitated.

In another aspect, in the above-described lens barrels and the above-described optical imaging systems, the reinforcing portion is provided at the electric section body at substantially the same position as the locking portions or between the locking portions and the sliding portions in the direction perpendicular to the arrangement direction.

In the lens barrel and the optical imaging system of such a configuration, the displacement in the arrangement direction of the sliding portion caused by the deformation of the electric section body can be effectively inhibited.

In another aspect, in the above-described lens barrels and the above-described optical imaging systems, the reinforcing portion is a rib-like protruding portion formed by applying pressure to part of the electric section body.

With the lens barrel and the optical imaging system of such a configuration, the reinforcing portion can be formed by pressing and the cost thereof can be easily reduced.

In another aspect, in the above-described lens barrels and the above-described optical imaging systems, the printed board is constituted by a flexible printed board; the printed board is attached to the outer circumference of the fixed tube along the circumferential direction thereof; the drive member is provided with an annular lens engagement member provided rotatably around a center axis of the fixed tube; the movable lens group is engaged with the lens engagement member so as to be movable in an optical axis direction following the rotation of the lens engagement member; and the electric section is held at the lens engagement member so that the sliding portions can slide along the conductor pattern of the printed board and output an electric signal following the rotation of the lens engagement member.

With the lens barrel and the optical imaging system of such a configuration, since the printed board is attached to the outer circumference of the fixed tube, the electric connection is facilitated and a structure suitable for position detection of the fixed tube and the drive member that require size reduction in the optical axis direction is obtained.

In another aspect, in the above-described lens barrels and the above-described optical imaging systems, the printed board is formed of a flexible printed board; the printed board is attached to the outer circumference of the fixed tube along the circumferential direction thereof; the drive member is provided with an annular lens engagement member provided rotatably around a center axis of the fixed tube and an annular drive operation member that rotationally operates the lens engagement member; the drive operation member is connected to the lens engagement member and provided rotatably diametrically outside of the fixed tube; the movable lens group is engaged with the lens engagement member so as to be movable in an optical axis direction following the rotation of the lens engagement member; and the electric section is held at the drive operation member so that the sliding portions can slide along the conductor pattern of the printed board and output an electric signal following the rotation of the drive operation member.

With the lens barrel and the optical imaging system of such a configuration, for example, where the electric section is held at the drive operation member by an elastic force of the sliding pieces, the electric section can be held at the drive operation member, without using a fixing screw or the like, as in the conventional configuration. Therefore, in the lens barrel and the optical imaging system of such a configuration, the electric section can be held by using a drive operation member of a small thickness and the size in the diametrical direction can be reduced.

This application is based on Japanese Patent application No. 2011-121750 filed in Japan Patent Office on May 31, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A lens barrel comprising:
a fixed tube;
a drive member that moves a movable lens group in an optical axis direction relative to the fixed tube;
a printed board that has a conductor pattern and is held at either of the fixed tube and the drive member; and
an electric section that is held at the other one of the fixed tube and the drive member and has a plurality of sliding portions that slide along the conductor pattern, wherein
the electric section is provided with a thin-sheet electric section body that supports the plurality of sliding portions arranged in a predetermined direction with a spacing therebetween; and
the electric section body is provided with a reinforcing portion that reinforces the electric section body to impart resistance to deformation thereto.

2. The lens barrel according to claim 1, wherein
a section holding portion that holds the electric section is provided at the other one of the fixed tube and the drive member;

locking portions that lock the electric section body to the section holding portion are provided at both ends of the electric section body in the arrangement direction of the sliding portions; and
the locking portions are arranged in the section holding portion so that the electric section body cannot move in the arrangement direction, but can move in a direction perpendicular to the arrangement direction relative to the section holding portion, and are locked to the section holding portion in a state in which the electric section body is positioned with respect to the section holding portion in the perpendicular direction.

3. The lens barrel according to claim 2, wherein
the sliding portions are provided at distal ends of respective elastic sliding pieces;
the electric section body supports proximal ends of the sliding pieces;
the section holding portion is provided with a body receptacle that receives one face side of the electric section body and a locking portion receptacle that is formed adjacently to the body receptacle in the direction opposite the direction of the body receptacle and receives the locking portions; and
the locking portions protrude in the arrangement direction from both ends of the electric section body in the arrangement direction, and when the locking portions are received by the locking portion receptacle, the sliding portions and the conductor pattern come into contact with each other, whereby another face side that is on the side opposite to the one face in the locking portion is pushed against the locking portion receptacle by an elastic force accommodated in the sliding pieces as a result of the contact.

4. The lens barrel according to claim 1, wherein the reinforcing portion is provided at the electric section body at substantially the same position as the locking portions or between the locking portions and the sliding portions in the direction perpendicular to the arrangement direction.

5. The lens barrel according to claim 1, wherein the reinforcing portion is a rib-like protruding portion formed by applying pressure to part of the electric section body.

6. The lens barrel according to claim 1, wherein
the printed board is a flexible printed board;
the printed board is attached to the outer circumference of the fixed tube along a circumferential direction thereof;
the drive member is provided with an annular lens engagement member provided rotatably around a center axis of the fixed tube;
the movable lens group is engaged with the lens engagement member so as to be movable in an optical axis direction following the rotation of the lens engagement member; and
the electric section is held at the lens engagement member so that the sliding portions can slide along the conductor pattern of the printed board and output an electric signal following the rotation of the lens engagement member.

7. The lens barrel according to claim 1, wherein
the printed board is formed of a flexible printed board;
the printed board is attached to the outer circumference of the fixed tube along a circumferential direction thereof;
the drive member is provided with an annular lens engagement member provided rotatably around a center axis of the fixed tube and an annular drive operation member that rotationally operates the lens engagement member;
the drive operation member is connected to the lens engagement member and provided rotatably diametrically outside of the fixed tube;

the movable lens group is engaged with the lens engagement member so as to be movable in an optical axis direction following the rotation of the lens engagement member; and the electric section is held at the drive operation member so that the sliding portions can slide along the conductor pattern of the printed board and output an electric signal following the rotation of the drive operation member.

8. An imaging optical system comprising:

a lens barrel provided with a fixed tube; a drive member that moves a movable lens group in an optical axis direction relative to the fixed tube; a printed board that has a conductor pattern and is held at one of the fixed tube and the drive member; and an electric section that is held at the other one of the fixed tube and the drive member and has a plurality of sliding portions that slide along the conductor pattern; and one or a plurality of lenses accommodated in the lens barrel, wherein the electric section is provided with a thin-sheet electric section body that supports the plurality of sliding portions arranged in a predetermined direction with a spacing therebetween; and the electric section body is provided with a reinforcing portion that reinforces the electric section body to impart resistance to deformation thereto.

* * * * *